Feb. 26, 1963  A. G. MAKOWSKI  3,078,517
MANUFACTURE OF PLASTIC ARTICLES
Filed Dec. 17, 1959  3 Sheets-Sheet 1

INVENTOR.
ALEXANDER GEORGE MAKOWSKI
BY Russell L. Root
George W. Reiber
ATTORNEYS

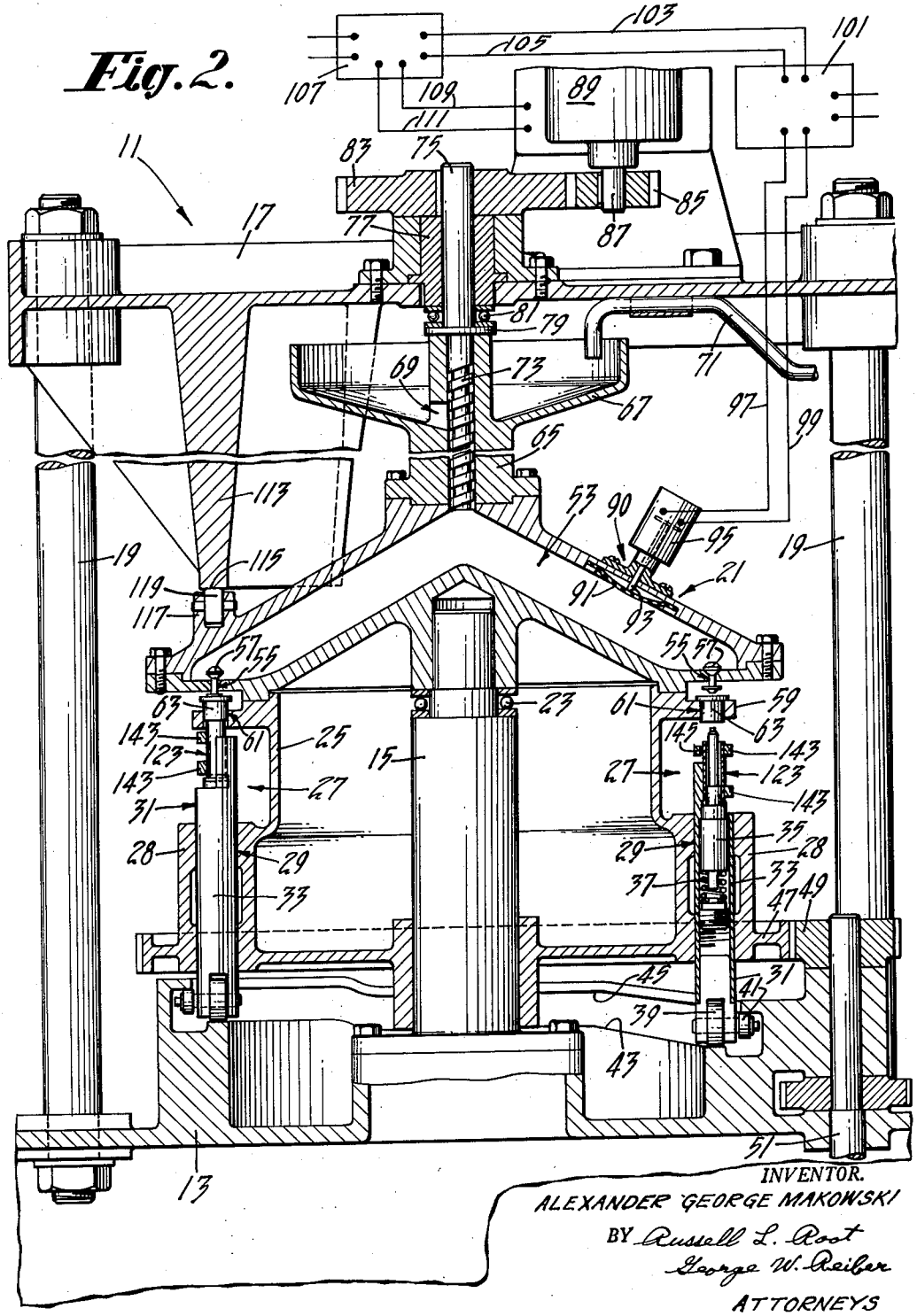

Feb. 26, 1963  A. G. MAKOWSKI  3,078,517
MANUFACTURE OF PLASTIC ARTICLES
Filed Dec. 17, 1959  3 Sheets-Sheet 3
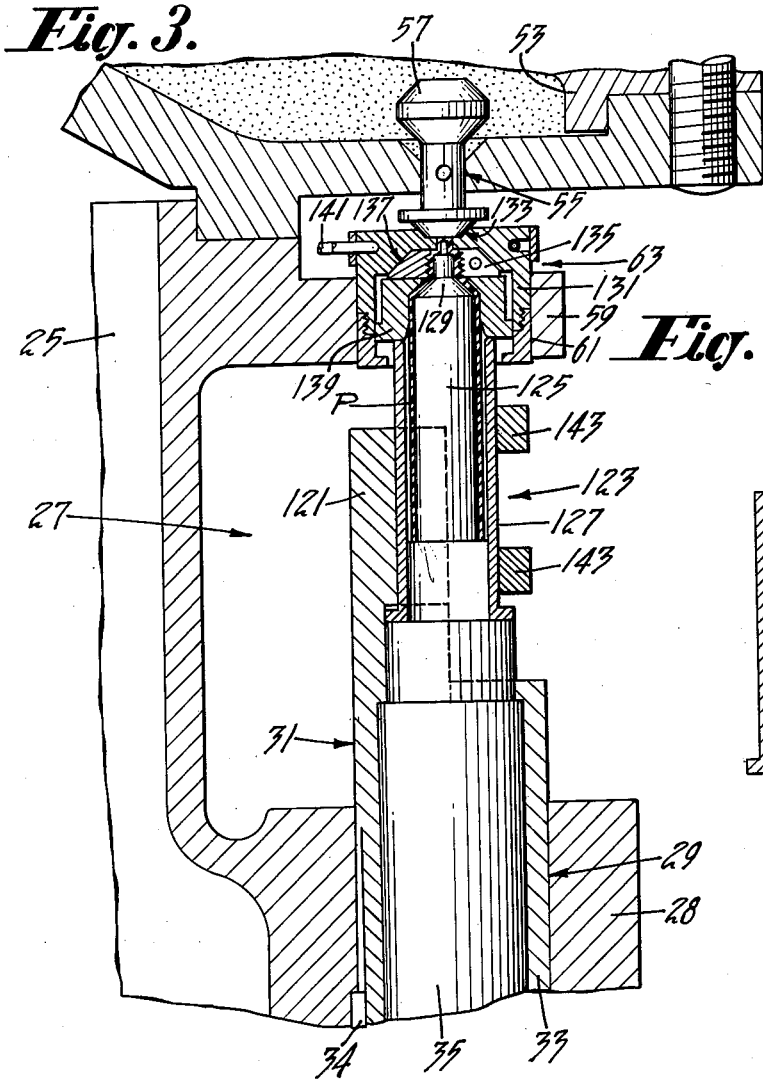
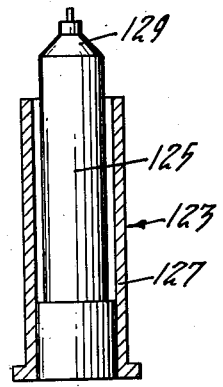
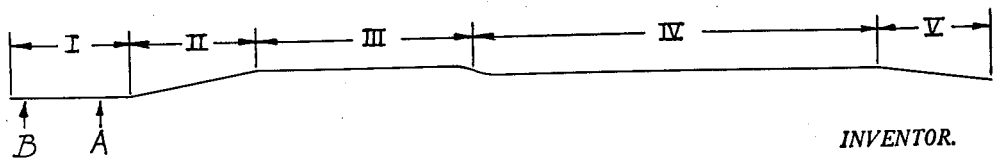
INVENTOR.
ALEXANDER GEORGE MAKOWSKI
BY Russell L. Root
George W. Reiber
ATTORNEYS

United States Patent Office 3,078,517
Patented Feb. 26, 1963

3,078,517
MANUFACTURE OF PLASTIC ARTICLES
Alexander George Makowski, Fayville, Mass., assignor to American Can Company, New York, N.Y., a corporation of New Jersey
Filed Dec. 17, 1959, Ser. No. 860,138
5 Claims. (Cl. 18—20)

This invention relates to injection molding of thermoplastic materials, and in some of its more specific aspects to the inejction molding of heads on tubular containers of thermoplastic material.

Heretofore injection molding machines have been arranged to close a mold under press platen pressure, inject the plasticized material under pressure into the mold and hold the same closed to permit cooling. Machines which were designed for this purpose with serial operation in mind were uniformly of the indexing or intermittently stepped type wherein each mold, carried by a rotary table is indexed into injection position or press station and after injection is there held until the mold contents is sufficiently cooled to reach a set condition.

It is an object, therefore, of the present invention to provide for injection molding by a smooth continuous process which avoids the delays and mechanical shocks characteristic of the intermittent operation heretofore practiced.

According to previously known methods it has been the practice to make containers by loading plastic tubular elements on the mandrels of an injection molding machine, wherein each mandrel or tool forms one part of a mold, and then to unload the finished work from the mandrel immediately after molding. Not only are the loading and unloading operations somewhat unwieldy but, if mechanized, they add to the complexity and inaccessibility of the molding machine structure. Moreover additional loading and unloading of the tubes or finished containers at other locations is also normally required for the performance of other operations such as printing, trimming, capping and the like. All of this handling together with the necessity for and difficulty of handling and controlling the relatively soft, deformable tubes while they are off the mandrels gives rise to many difficulties and slowdowns which all affect the cost of operations.

It is another object of the present invention, therefore, to provide a system for the injection molding of articles wherein the articles are placed on tools or holders each forming a part of a mold and to carry the tools onto the injection molding machine where the mold is completed and the injection filling of the mold occurs, then to separate the tool from the mold-completing part, carry it away from the molding machine with the work held thereon, and perform one or more secondary operations on the work while still carried, supported and controlled by the said tool or holder.

It is a feature of the present invention that, in order to provide a smoothly rotating assembly which avoids the intermittent motion devices heretofore used, the plural pocket rotating head of the machine carries a reservoir of plasticized material at suitable temperature and pressure for injection into a mold cavity, and that said reservoir rotates with the head and has plural provisions for emitting the plasticized material, one of such provisions being arranged at a location to serve each pocket of the head.

Another feature of the invention is the provision of a unique means for continually supplying plasticized material to the reservoir and for maintaining the proper pressure therein. This means comprises a plasticizing, mixing and pressure delivery screw arranged in a cylinder which is in effect an extension of the rotary reservoir, the screw having relative rotation with respect thereto in a direction tending to feed plastic into the reservoir. The screw may be stationary, or may be separately rotated relative to the reservoir by an auxiliary power means controllable in response to pressures sensed in the reservoir.

Still another feature of the invention is the arrangement of a firmly anchored back-up strut in rolling contact with the rotating head and positioned so as to accept the high thrust occassioned by the clamping pressures needed to close the molds adequately during injection of the plasticized material.

A further feature of the invention includes the provision, as an extension of the rotary cylinder which houses the plasticizing screw, a rotary hopper which serves as a reserve of unplasticized material, and constitutes means whereby such material can be forwarded into operative position on the rotary head through a conduit from a stationary source.

Other objects, features and advantages of the invention will appear hereinafter as the description proceeds.

In the accompanying drawings:

FIG. 2 is a compressed vertical section of an injection molding machine according to the present invention, taken substantially on line 2—2 of FIG. 1 and shown to a slightly reduced scale;

FIG. 3 is an enlarged detail section of one of the pockets and the tools and work carried thereby as shown generally in FIG. 2, and taken substantially on line 3—3 of FIG. 1;

FIG. 4 is a development of the profile of the tool operating cam shown in FIG. 2, but to a reduced scale; and FIG. 5 is a detail section showing the removable tool separated from the injection machine.

Figure 1:
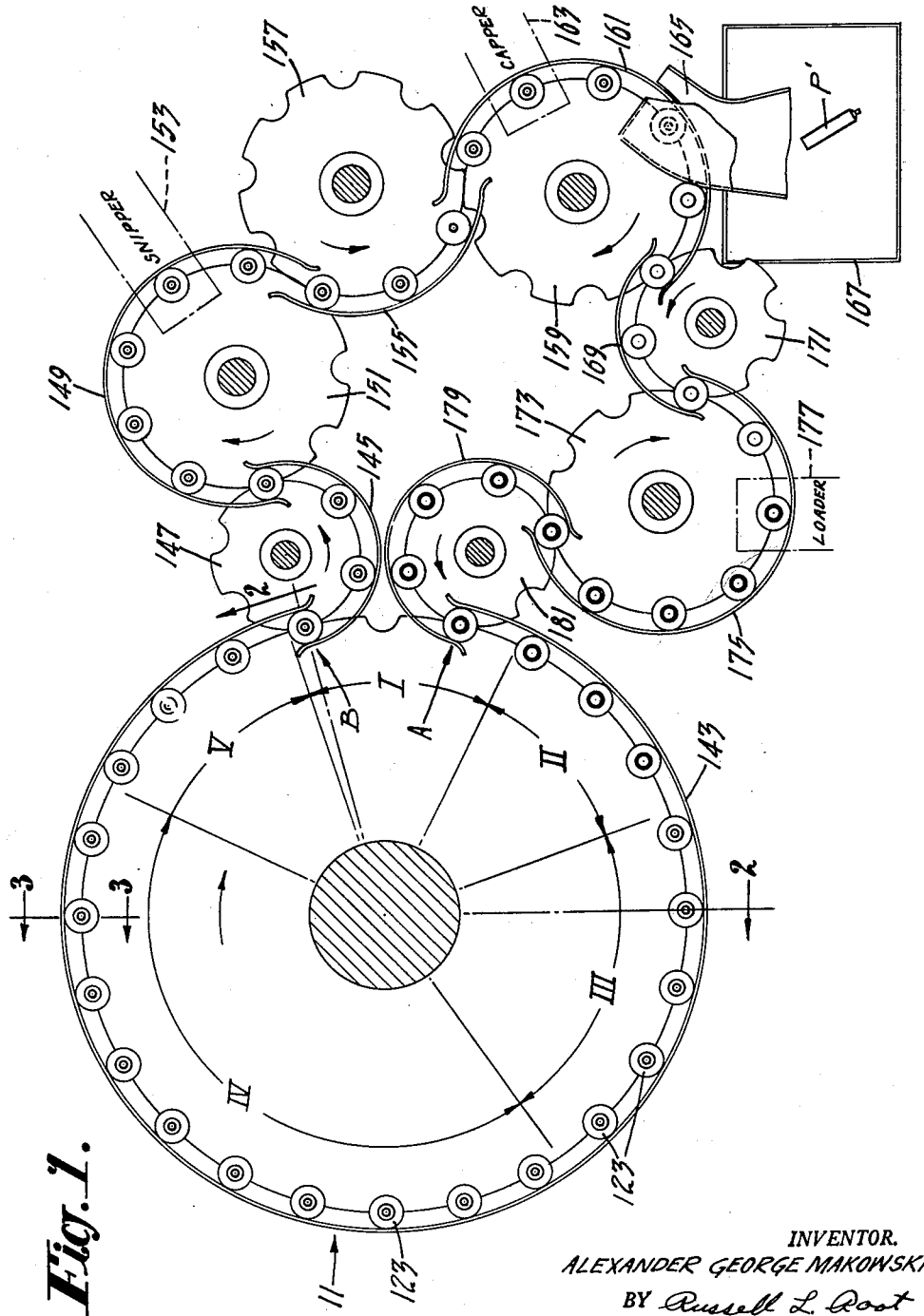
FIG. 1 is a schematic plan of an equipment according to the present invention comprising a plastic tube production line including an injection molding machine.

Referring to the drawing, especially FIG. 2, the injection molding machine of the present invention is indicated generally by reference numeral 11 and comprises a base 13 upon which is mounted a vertical post 15. A cap frame 17 is carried by the base and supported thereabove by tie rods 19.

A rotatable head 21 is supported on the post 15 between the base and cap frame, as by thrust bearing 23, and includes a skirt portion 25 provided with a plurality of working positions or pockets 27. At each of the pockets 27 is located a boss 28 having a bore 29 in which is slidably carried a mold operating element or tool-supporting plunger 31. Each plunger comprises an outer sleeve 33 which is slidably keyed to the skirt 25 by the key 34 (FIG. 3) to maintain its properly oriented relationship. The plunger also comprises a plug 35 slidably telescoped in the sleeve 33 and urged to an upward limiting position therein by a strong compression spring 37. The lower end of each plunger carries rollers 39 and 41 arranged to co-operate with the complementary surfaces 43 and 45 respectively of a stationary barrel cam affixed to the base 13.

The lower rim of the skirt 25 also carries large gear 47 which meshes with a drive pinion 49 on drive shaft 51, powered by any suitable motive power source (not shown) to rotate the head 21 in a continuous fashion as required.

The rotary head, above the skirt portion 25 comprises a reservoir 53 designed to accommodate heated plasticized thermoplastic material under suitable injection pressure, e.g. about 3000 p.s.i. It will be understood that the reservoir is, to this end, provided with controlled heating means of conventional construction which is not shown since it forms no part of the present invention. As can be seen in FIG. 2 the reservoir 53 overhangs the skirt portion 25 and on the under surface of the overhang in vertical alignment with each pocket 27 is an opening 55 providing for egress of plastic material and controlled by the combined valve and injection nozzle member 57 which is slidable in the opening and is normally held in its lower or closed position by the pressure of the plastic material in the reservoir thereagainst.

Extending around the upper portion of the skirt 25 is a radial flange 59 which projects to a position between the plungers 31 and the corresponding nozzles 57. The flange has, at each pocket location, an opening 61 in which is floatingly mounted a female die member or matrix 63, so disposed as to be engageable by a tool carried upon the corresponding plunger 31 to thus form a complete mold, and to be raised thereby into contact with the corresponding valve 57 to raise the same and thereby bring about injection of the pressurized plasticized material into the mold to fill the same, as seen at the left hand portion of FIG. 2.

A central upward extension 65 of the rotating reservoir 53 forms a plasticizing cylinder near the upper end of which is integrally associated a circular rotating hopper 67. The latter is designed to receive charges of plastic in the form of powder, pellets, or the like. The plastic is fed to the cylinder 65 by gravity as required via an opening 69 in the cylinder wall. The hopper 67 is fed from time to time with plastic powder or pellets from a storage point (not shown) by means of a suitable conduit 71.

Within the cylinder 65 is a vertical screw 73 which coacts with the walls of the cylinder to mix and masticate the plastic material, render it plastic and urge the same forcefully in a downward direction into the reservoir 53. It will be readily understood that the walls of the cylinder 65 are heated to a suitable plasticizing temperature by conventional heating means either embedded therein to rotate therewith, or closely surrounding the same and mounted in stationary fashion on the machine frame.

While the screw 73 may be stationary and rely for its operation solely on the rotation of cylinder 65, in the preferred form of the invention the screw 73 is also rotatably mounted to provide greater flexibility and control, and to this end is provided with an upwardly extending shaft 75 which is rotatably supported in a radial bearing 77 carried by the cap frame 17. In the form of the invention shown, the head 21 is intended to rotate in a clockwise direction when viewed from the top, and screw 73 is provided with a right hand thread and is designed to operate at speeds lower than the speed of rotation of the head, including rotation in a direction reverse to that in which the head rotates. Inasmuch as there is considerable thrust generated by the operation of the screw 73 in pressurizing the reservoir 53, there is provided on the screw a thrust collar 79 acting against a suitable thrust bearing 81.

Upon the upper end of shaft 75 is affixed a gear 83 which meshes with drive gear 85 on the shaft 87 of a suitable auxiliary power means, e.g. electric motor 89. Mounted on a wall of the reservoir 53 is a pressure sensing device 90 shown as consisting of a diaphragm 91, a plunger 93 for sensing the diaphragm position, and a signal generator 95 for transmitting electromagnetic signals corresponding to the position of sensing plunger 93. The signals thus generated by the device 90 are carried via conductors 97 and 99 to an amplifier 101 where they are amplified to usable voltage and then carried via conductors 103 and 105 to motor controller 107 which furnishes the proper current supply via conductors 109 and 111 to the motor 89 to effect the driving action on screw 73 called for by the sensing device 90 to thus maintain the pressure in the reservoir within a suitable operative range for injection purposes. While the conductors 97 and 99 are shown diagrammatically as directly connected between sensing device 90 and amplifier 101, it will be understood that conventional means such as slip rings (not shown) will be provided to accommodate the rotary movement of the head 21.

A portion only of each rotary cycle of head 21 is characterized by an injection position of plungers 31 as determined by the cam surface 43 acting against the roller 39 as will appear in more detail hereinafter. This would tend to cause a rather heavy unbalanced cocking load on the rotary head 21, except that such is prevented by an efficient load balancing arrangement comprising a thrust transmitting sector 113 supported from the cap frame 17 and presenting an arcuate bottom track surface 115 of length sufficient to encompass the portion of head travel characterized by an injection position of the plungers 33. This will be seen to extend for about 75° in the case of the machine shown in the drawings (see FIG. 1). The upper surface of the reservoir 53 carries a ring of bearings sets 117, each of which supports a roller 119 in position to provide smooth rolling contact with the surface 115 of sector 113. The rollers 119 are spaced at frequent intervals about reservoir periphery.

Turning now to FIG. 3 where the structure of the equipment appearing in each individual pocket 27 is shown to enlarged scale, it will be seen that the upper surface of the plug 35, in cooperation with an upward extension 121 of the inner half of the sleeve 33, supports a workpiece-carrying tool 123, shown individually in FIG. 5. The tool consists essentially of a mandrel 125 and a pusher 127. The mandrel is of a diameter to snugly receive a preformed plastic tubular element and has an upper end 129 shaped to mold the inner surfaces of a container head. The pusher 127 is a rigid sleeve spaced from and surrounding the mandrel, and rigidly secured thereto at the base by any suitable means.

The tool 123 is aligned with and arranged to be raised into contact with its corresponding matrix 63 by the tool-supporting plunger 31.

As can be seen in FIG. 3, the matrix comprises a housing 131 having a seat 133 on its upper surface designed to coact with the nozzle 57 as heretofore mentioned. The interior of the housing 131 floatably supports the sectional thread plates 135 which are designed to cooperate with cam surface 137, in the housing, and operating ring 139. When these parts are in their uppermost position, in which they will be held by the pusher 127 when the mold is closed, they define with the surface 129 and the end of a plastic tube carried on the mandrel 125, a mold cavity adapted to be filled with the plasticized material in reservoir 53. When the tool starts to withdraw and the operating ring and thread plates are allowed to drop, the latter spread to permit withdrawal of the completed workpiece. The specific coaction of parts of the nature of those just described is set out at length in United States Patents Nos. 2,812,548 and 2,883,706, to which reference may be had for further information. There may also be associated with the matrix 63, if desired, a cooling means 141 connected in any suitable fashion (not shown) with a source of circulating liquid coolant for controlling the mold temperature. In this connection it may be noted that standard services such as cooling or heating fluids, or electricity, wherever required on the machine, may be provided in conventional manner by bringing the same up through the post 15 using rotary connections of conventional commercial type.

The retention of the tools 123 in place on the machine is accomplished by means of guide rails 143, and the member 127, in addition to its function as a pusher for operating the matrix, provides a guard which prevents detrimental contact between the guides 143 and the workpiece on the mandrel 125.

Turning to FIG. 1 wherein is schematically shown a plan of the entire container making equipment, the rotary injection machine, shown as having 24 pockets, is at the left of the view, and it can be seen that the same is nearly surrounded by the guides 143. The guides, however, terminate at position A, the loading position, and position B, the unloading position. The various arcs of extension of the features of cam 43, 45 are marked on this view as well as in the developed cam profile of FIG. 4, and consist essentially in a "low" or load-unload section of about 45° containing the positions A and B, a rising section II of about 45°, a "high" or injection section III of about 75°, an "intermediate" or cooling section IV of about 150° and a lowering section V of about 45°.

The position of the parts when they are above section III of the cam is best illustrated at the left hand portion of FIG. 2, and the position of the parts when above section I is best illustrated at the right hand side of FIG. 2. FIG. 3 shows the position of the parts when they are peripherally situated over section IV of the cam.

As can be seen in FIG. 1 when a tool 123 carrying a workpiece P has reached position B it is then in lowered position and is swept out of the pocket on the injection molding machine 11 by a guide 145 and into a pocket on a transfer turret 147. After traversing a partial periphery of the latter, another guide 149 sweeps the tool and workpiece into the pocket of a turret 151 which carries it into operative relationship with a supplementary operation device 153, in this particular instance a cutting device designed to snip the closed end of the neck to form a mouth thereon. Another guide 155 then sweeps the tool onto a transfer turret 157 which carries it to a second working turret 159 onto which it is swept by a guide 161. This turret carries the tool first into operative relationship to a further supplementary operation device 163, which in this instance threads a cap on the neck of each container as it passes. When the tool is carried adjacent a guide chute 165 where the completed container P is blown or otherwise doffed from the tool and passed, via chute 165 to a suitable receiving device 167 such as a hopper or conveyor.

From thence the now empty tool is swept by a guide 169 onto another transfer turret 171 and then onto a workpiece loading turret 173 by a guide 175, where the tool passes adjacent a device 177 which will apply to the tool any preliminary parts which must be in place before molding, in the present instance, a preformed open-end plastic tube. Finally a guide 179 sweeps the pre-loaded tool onto a transfer turret 181 where it is picked up by the other end of guides 143 and swept back into an empty pocket of the injection molding machine 11. It will be understood, of course, that suitable drive mechanism is provided for operating the injection molding machine 11 and the turrets 147, 151, 157, 159, 171 and 175 as well as the supplementary operation devices where necessary, each in proper timed relation with the other, but that this is not shown since its specific features form no part of the present invention.

In describing the operation it will be understood that the reservoir 53 is charged with plasticized material and that the machine 11 and the series of turrets 147, 151, 157, 159, 171, 173 and 181 are supplied with a continuous train of tools 123. The tool at position B has already had a plastic tube applied thereto and gradually and continuously moves in a clockwise direction as head 21 rotates being raised during sector II by the mold operating element 31 under the influence of cam surface 43. While in sector III the mold consisting of tool 123 and matrix 63 is held closed under the pressure of spring 37 and the corresponding valve 57 is raised to effect injection of softened plastic material into the mold cavity. During the passage through sector IV the mold operating element is lowered sufficiently by the cam surfaces 43, 45 to remove the majority of thrust from the undersurface of the reservoir and to allow the valve 57 to close while still maintaining the mold 123, 63 in closed position in order for the injected material to cool under controlled conditions. As the tool passes through zone V, the mold operating element 31 is lowered by the cam so that the tool 123 is withdrawn from the matrix 63 which is left suspended in the ring 59.

Directly the tool with its workpiece at position B is transported laterally off the machine 11 to the turret 151 where the closed neck of the container is snipped to provide an opening by cutter 153, and then is carried to turret 159 where a threaded cap is applied to the container neck and the completed container is finally doffed from the tool 123 and carried away. The emptied tool 123 then reaches turret 173 where the device 177 places a fresh open-ended plastic tube on the mandrel 125 and the tool is then ready for reentry into the injection machine at position A to begin another complete cycle.

It will be understood that each tool in turn passes through the cycle outlined above so that there is a continuous smooth-flowing stream of tools passing through the equipment at all times.

From the foregoing description it can be seen that this invention provides a new equipment for producing articles of an injection molded nature on a continuous operation basis, and for controlling and handling the articles by means of the same tools on which they are injection molded, through one or more auxiliary operations, thus providing a smooth, speedy and highly economical mechanical operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for continuously forming tubular articles from thermoplastic material, comprising a base, a central support erected from said base, a head mounted by said support for rotation thereon, said head including a pair of spaced and connected sloping wall members defining therebetween a heated reservoir for softened thermoplastic material and an annular skirt depending from said head and providing a plurality of circumferentially spaced work stations, a shiftable mold operating element and a mold supported by said skirt at each of said work stations, each mold being movable to a closed position in response to movement of the corresponding operating element in one direction and being openable when said element moves in an opposite direction, one of said sloping wall members having a plurality of circumferentially spaced openings therein, valve means in said openings operable to introduce softened plastic from said reservoir into each mold when the same is closed, first cam means depending from said skirt and second cam means formed on said base, said first and second cam means being effective upon rotation of said head to move said operating elements from a low position through a rising position to a high position and then through intermediate and lowering positions back to said low position, and means for continuously rotating said head.

2. An equipment for manufacturing thermoplastic containers, comprising a continuously rotating injection molding machine having a rotary injection head provided with a series of injection orifices therein, a series of molds each comprising a matrix floatably carried on the head and aligned beneath an injection orifice and a workpiece carrying tool adapted to receive a preformed plastic tube to have a closed end molded thereon by said injection molding machine, said tool being continuously aligned beneath a matrix and being shiftable while on the machine axially into and out of contact with the matrix from a low position through a rising position to a high position and then through intermediate and lowering positions to said low position to form said articles, and shiftable laterally from a position on the machine to a supplementary operation station off the machine; said machine having a loading and an unloading position; a plurality of supplementary operation turrets arranged in series between said unloading position and said loading position and rotated in timed relation with said continuously rotating injection molding machine; one of said turrets delivering a tool with the injection molded container as it comes from the unloading position into operative relation to a cutter for snipping the end of the container to open the same, and another of said turrets delivering the thus snipped container into operative relation to a capper for placing a cap thereon; means adjacent one of said turrets for loading the tools each with a preformed tube before the tool is returned to said machine at said loading station; means for shifting a tool laterally onto the machine each time a matrix reaches said loading position; mechanical means for shifting each tool laterally off the machine and onto said one supplementary operation turrets; and means for unloading the completed containers from the tools at said other supplementary operation turret.

3. A machine as defined in claim 1 in which there is included means to pressurize the reservoir which includes a cylinder communicating with the reservoir and mounted on said other sloping wall member to rotate therewith, and a screw mounted independently of the cylinder and extending thereinto.

4. A machine as defined in claim 1 in which there is included means to pressurize the reservoir which includes a cylinder communicating with the reservoir and mounted on said other sloping wall member to rotate therewith, and a screw mounted independently of the cylinder and extending thereinto, and in which there is a rotary hopper mounted upon and rotatable with said cylinder and head.

5. A machine as set forth in claim 1 in which there is also provided an arcuate reaction element in rotary contact with said other sloping wall member on the reservoir periphery and over the injection situs to resist cocking pressures on the head.

References Cited in the file of this patent

UNITED STATES PATENTS

| | | |
|---|---|---|
| 2,359,840 | Goessling | Oct. 10, 1944 |
| 2,447,101 | Stock | Aug. 17, 1948 |
| 2,505,540 | Goldhard | Apr. 25, 1950 |
| 2,528,509 | Goodrich | Nov. 7, 1950 |
| 2,679,660 | Bain | June 1, 1954 |
| 2,699,574 | Gilbert | Jan. 18, 1955 |
| 2,747,224 | Koch et al. | May 29, 1956 |
| 2,832,095 | Ashley | Apr. 29, 1958 |
| 2,881,475 | Wilckens | Apr. 14, 1959 |
| 2,883,706 | Quinche et al. | Apr. 28, 1959 |
| 2,954,585 | Simpson | Oct. 4, 1960 |

FOREIGN PATENTS

| | | |
|---|---|---|
| 1,169,524 | France | Sept. 15, 1958 |
| 767,164 | Great Britain | Jan. 28, 1957 |
| 314,978 | Switzerland | Aug. 31, 1956 |